Dec. 4, 1956  B. SHARP  2,772,577
DREDGE DRIVE

Filed April 2, 1954  2 Sheets-Sheet 1

INVENTOR.
BAYARD SHARP
BY Marcus Lothrop
ATTORNEY

INVENTOR.
BAYARD SHARP

United States Patent Office 2,772,577
Patented Dec. 4, 1956

2,772,577
DREDGE DRIVE

Bayard Sharp, Alameda, Calif., assignor to Yuba Manufacturing Company, a corporation Application April 2, 1954, Serial No. 420,697

4 Claims. (Cl. 74—359)

Although my invention has general application, it relates particularly to a dredge drive especially adapted for use in driving the upper tumbler shaft on an alluvial dredge. Dredges of this sort are well known and include a hull on which is mounted an endless chain of digging buckets pivoted together and trained at their lower end around a lower tumbler and at their upper end around an upper, driving tumbler. In large dredges, the weight of the bucket line is so great and the massiveness of the upper drive tumbler is so large that it is customary to employ a duplex drive to the upper tumbler shaft. This is also partly for the reason that any failure in the bucket drive line is exceedingly serious. The dual or duplex drive to the upper tumbler shaft is normally through the medium of gears of large size and sometimes involves a gear drive with two or more selectable drive ratios. Partly because of the massiveness of the machinery, the length of some of the driving shafts and for other reasons, it is quite difficult to provide the customary duplex or duplicate drive and obtain or maintain appropriate gear mesh, especially when various shiftable drive ratios are available. The flexibility of the drive parts, various necessary manufacturing tolerances, mechanical deflections and various other factors make it extremely difficult to provide a satisfactory multi-speed, duplex drive on a dredge.

It is therefore an object of my invention to provide a dredge drive which is of the preferred duplex nature and yet in which multiple drive ratios are employed smoothly and without undue strain.

Another object of my invention is in general to provide an improved dredge drive.

Another object of my invention is to provide a multi-ratio drive for dredges which can be effectively shifted from one ratio to another without strain on the mechanism and quite positively.

A still further object of my invention is to provide a dredge drive readily controlled by the dredge operator and utilizing much of the equipment already provided on a dredge.

Another object of my invention is to provide a dredge drive of a duplex nature in which precise synchronization of the two portions of the duplex drive is not absolutely essential.

A still further object of my invention is to provide a dredge drive of duplex nature in which misalignment or polar displacement of one portion of the duplex drive does not adversely affect the operation of the other portion of the duplex drive.

Other objects, together with the foregoing, are attained in the form of the invention described in the accompanying description and illustrated in the accompanying drawings, in which.

Figure 1:
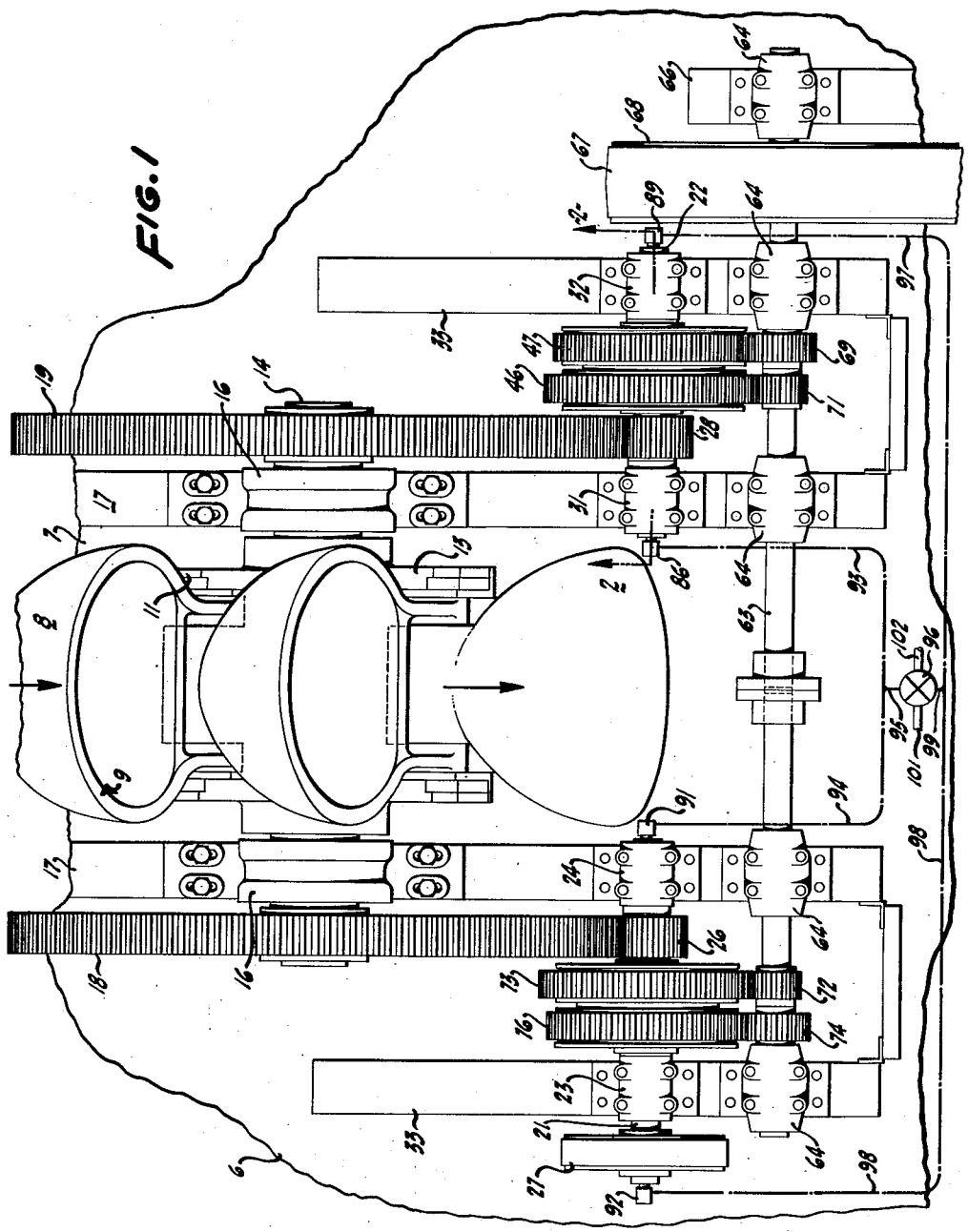
Figure 1 is a plan of a portion of a dredge showing the dredge drive of my invention with a portion of the bucket line and adjacent structure.

In its preferred form, the dredge drive of the invention is utilized on a dredge having a deck 6 on which the mechanism is mounted. Operating within a well 7 in the deck is a bucket line 9 comprised of a plurality of buckets 8 connected together by bucket pins 11 and designed to travel around a tumbler 13 on an upper tumbler shaft 14. The massive upper tumbler shaft is mounted for rotation with respect to the deck 6 in journal blocks 16 carried on a framework 17. Since substantially all of the structure is symmetrical about a plane coincident with the center line of the buckets, the description applicable to one side of the structure is also applicable to the other side thereof. For example, outboard of the bearing blocks 16 the upper tumbler shaft 14 is at its opposite ends provided with a pair of substantially identical bull gears 18 and 19 of considerable diameter, the ones shown being approximately ten feet in pitch diameter.

Arranged on the deck 6 in alignment and with their axis parallel to the axis of the upper tumbler shaft 14 are pinion shafts 21 and 22 which, for the most part, are substantially identical. The pinion shaft 21, for example, is mounted for rotation in pillow blocks 23 and 24 and carries fixed to it a bull pinion 26 in mesh with the bull gear 18. On one end, adjacent the pillow block 23, the pinion shaft 21 has a brake structure 27 which serves, when applied, to hold the parts against rotation. The brake mechanism is one of the few that is not duplicated on the pinion shaft 22. A bull pinion 28 in mesh with the bull gear 19 is fixed on the pinion shaft 22 for rotation in unison therewith.

Figure 2:
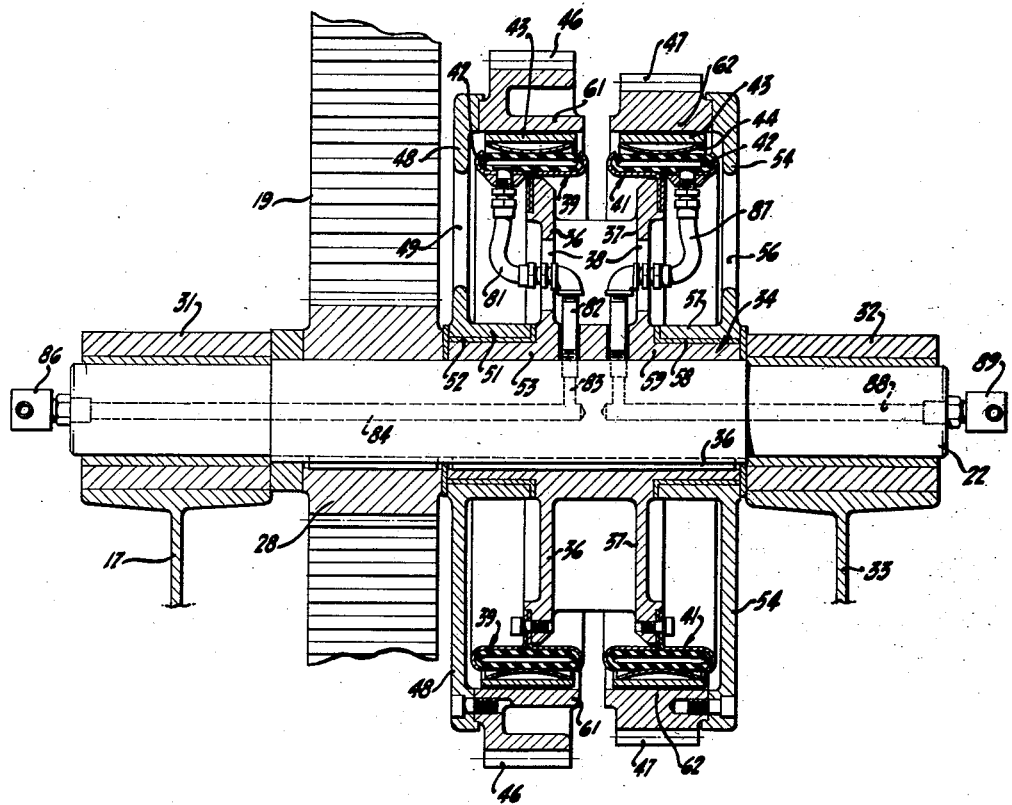
Figure 2 is a cross-section, the plane of which is indicated by the lines 2—2 of Figure 1.

Since, except for the brake 27, the pinion shafts 21 and 22 are substantially alike, the showing of the pinion shaft 22 in Figure 2 substantially illustrates the pinion shaft 21 as well. The shaft 22 is carried in pillow blocks 31 and 32 mounted on the frame 17 and on an auxiliary frame member 33. Between the bull pinion 28 and the journal block 32, the pinion shaft is provided with a clutch hub 34 secured thereto by means of a key 36. The clutch hub 34 is symmetrical about a central plane perpendicular to its rotational axis and includes a pair of outstanding clutch webs 36 and 37. The webs 36 and 37 have apertures 38 therein and extend substantially radially from the shaft 22. Each of them carries one of a pair of pneumatic clutches 39 and 41 of substantially standard construction. Each of these includes an inflatable tube 42 of a small, collapsed diameter when uninflated or not energized and of a large diameter when energized or inflated. The movement of the flexible members 42 is followed by clutch friction shoes 43, the return motion of which is influenced by springs 44.

Substantially overlying or surrounding each of the clutch webs 36 and 37 is a pair of drive gears substantially alike but differentiated in that outside of the web 36 there is provided a relatively large drive gear 46, whereas outside of the clutch web 37 there is provided a relatively small drive gear 47. The large drive gear 46 includes a radial plate 48 having an opening 49 therein and at its interior portion includes a journal sleeve 51 having an anti-friction bushing 52 therein. This is rotatable upon a journal bearing 53 forming part of the clutch hub 34 so that unless otherwise connected the large drive gear 46 can rotate quite freely with respect to the clutch hub 34 and the pinion shaft 22.

Somewhat similarly, the small drive gear 47 is inclusive of a drive gear plate 54 having an opening 56 therein and is provided with a journal sleeve 57 lined with an anti-friction bushing 58. This runs on a journal bearing 59 disposed on the clutch hub symmetrically with respect to the journal bearing 53. Unless otherwise connected, the small drive gear 47 is freely rotatable upon the clutch hub and relative to the pinion shaft 22.

As part of the construction of the large gear 46, there is provided a clutch drum 61 overlying the friction shoe 43 of its associated clutch and normally spaced slightly therefrom when the inflatable member 39 is not energized or inflated. Similarly, the small gear 47 is formed to provide an integral clutch drum 62 overlying and normally spaced from the friction shoe 43 of the inflatable member 41 when it is collapsed.

Running parallel to the pinion shafts 21 and 22 and also parallel to the upper tumbler shaft 14 is a drive shaft 63 usually made up of several portions coupled together. The drive shaft is mounted in appropriately aligned journal boxes 64 secured to the various frame members 17 and 33, as well as to auxiliary framing 66 on the deck 6. The shaft 63 is rotated by means of a belt 67 operating on a pulley 68 fast on the shaft and driven from any suitable source, such as an electric motor. Adjacent the drive end, the drive shaft 63 is provided with a large drive pinion 69 fixed on the shaft and meshing with the small drive gear 47 and is also provided with a small drive pinion 71 fixed on the shaft and meshing with the large drive gear 46. In symmetrical location at the other side of the duplex drive, the drive shaft 63 has fixed on it a small drive pinion 72 meshing with the corresponding large drive gear 73 journalled on the pinion shaft 21, and has keyed to it a large drive pinion 74 meshing with a small drive gear 76 running freely on the pinion shaft 21.

As so far described and with all of the four pneumatic clutches deflated or not energized, as shown in Figure 2, no drive is transmitted from the continuously rotating driving shaft 64 to the pinion shafts 21 and 22 and consequently no drive is transmitted to the upper tumbler shaft 14.

In order that the drives may be appropriately accomplished, each of the various pneumatic clutches is provided, especially as shown in Figure 2, with a pneumatic control connection. For example, the pneumatic clutch member 39 has a flexible hose 81 accessible through the opening 49 and extending through the aperture 38 to a pipe 82 passing through the clutch hub 34 and connecting with a radial bore 83 and an axial bore 84 within the pinion shaft 22 to join a swivel connector 86. Also, the pneumatic clutch member 41 has a hose 87 passing through the aperture 38 and accessible through the opening 56, thence connected to a bore 88 within the pinion shaft and finally joining a swivel connector 89. Similarly, the clutches for the gears 73 and 76 are provided, respectively, with swivel connectors 91 and 92.

In accordance with the invention, the swivel connectors 86 and 91 are connected in parallel by means of conduits 93 and 94 joining a pipe 95 leading into a control valve 96. Comparably, the swivel connectors 89 and 92 are connected by lines 97 and 98 to a pipe 99 leading to the control valve 96. In this fashion, the pneumatic clutches for the two small drive gears 47 and 76 are connected in parallel, and the pneumatic clutches for the two large drive gears 46 and 73 are connected in parallel. The control valve 96 is supplied with air or other fluid under pressure through a lead duct 101, and also is provided with an exhaust connector 102.

With this mechanism, when the valve is in the position shown in Figure 1, air from the source 101 is led in through the ducts 93 and 94 and through the swivel connectors 86 and 91 into the two pneumatic clutches 39 within the larger gears 46 and 73. Therein the expansible chambers 42 are swelled by the air or other fluid under pressure so that the friction shoes 43 are driven into hard frictional engagement with the interior of the drums 61. In this way, both of the large drive gears 46 and 73 are practically simultaneously coupled to the pinion shafts 21 and 22, whereas the small drive gears 76 and 47 remain free to rotate on the respective pinion shafts. Consequently, a relatively low speed drive is effectuated between the shaft 63 and the upper tumbler shaft 14 through the drive pinions 71 and 72, the drive gears 46 and 73, the bull pinions 26 and 28 and the bull gears 18 and 19. An advantage of the pneumatic friction clutch is that even though the drive shaft 63 may twist due to heavy torque, or even though the meshing of the various gears may not be precisely the same on both sides of the duplex drive, an effective coupling is nevertheless made so that the duplex drive is actuated uniformly and properly. The result is that the upper tumbler shaft 14 is properly driven from both ends.

When it is desired to change the speed of operation of the bucket line 9, the operator merely manipulates the valve 96, thus permitting the springs 43 in the pneumatic clutches which have been energized to drive out the contained pressure fluid through the conduits and through the valve and through the discharge 102. At the same time, the valve 96 is effective to direct pressure fluid from the source 101 through the pipe 99 and through the parallel conduits 97 and 98 and through the swivels 89 and 92 into the clutches 41 associated with the clutch drums of the smaller drive gears 47 and 76. Thus, as the clutches 39 collapse, the clutches 41 expand and as the gears 46 and 73 are released to run freely on their pinion shafts 21 and 22, the other drive gears 47 and 76 are clutched to the pinion shafts 21 and 22.

The drive, when this action has been completed, is from the drive shaft 63 through the drive pinions 69 and 74, the respective smaller drive gears 47 and 76 to the pinion shafts 21 and 22, thence to the bull pinions 26 and 28 and the bull gears 18 and 19 to the upper tumbler shaft 14. The shift from one speed of drive to the other is accomplished despite distortions of the drive shaft 63, despite possible variation in intermediate loading of the various gear teeth, despite distortions in the bull gears 18 and 19, and despite inaccuracies in the duplex drive alignment. There is consequently no difficulty about the speed change, no undue loads, and no strain in effectuating an immediate change from a low speed rate of advance of the buckets to a high speed rate of advance. The shift occurs in a short time, one set of gears of the duplex drive taking up the burden as it is relinquished by the other set of duplex gears.

In accordance with my invention, therefore, I have provided a dredge drive effective to drive a bucket line through the upper tumbler shaft at either of two speeds with an instant shift from one speed to the other under the control of an operator and without interference due to misalignment or inaccuracies of the structure and with assurance that the heavy bucket line momentum will not be lost during a shift and a positive, duplex transmission of the driving force from the drive line to the bucket line.

What is claimed is:

1. A dredge drive comprising an upper tumbler shaft, a pair of bull gears fastened one at each end of said upper tumbler shaft, a pair of pinion shafts, bull pinions fast on said pinion shafts and meshing with said bull gears, a pair of clutch webs fast on each of said pinion shafts, drive gears of large diameter journalled with respect to each of said pinion shafts, drive gears of small diameter journalled with respect to each of said pinion shafts, a relatively long drive shaft subject to substantial twist under load disposed parallel to said pinion shafts, drive pinions fast on said drive shaft near the ends thereof and respectively meshing with said large drive gears and said small drive gears, pneumatic clutches engaging each of said clutch webs and for engaging said large drive gears and said small drive gears, and pneumatic connections for simultaneously engaging said clutches for said large drive gears or for simultaneously engaging said clutches for said small drive gears.

2. A dredge drive comprising an upper tumbler shaft, a pair of bull gears fastened one at each end of said upper tumbler shaft, a pair of alined pinion shafts parallel to said upper tumbler shaft, a pair of bull pinions each fast on one of said pinion shafts and in mesh with one of said bull gears, a pair of clutch webs fast on each of said pinion shafts, a first large drive gear journalled on one of said pinion shafts and coplanar with one of said clutch webs thereon, a first small drive gear journalled on said one of said pinion shafts and coplanar with the other of said clutch webs thereon, a second large drive gear journalled on the other of said pinion shafts and coplanar with one of said clutch webs thereon, a second small drive gear journalled on said other of said pinion shafts and coplanar with the other of said clutch webs thereon, a relatively long drive shaft subject to substantial twist when under load, drive pinions fast on said drive shaft near the ends thereof and meshing with said first and second large drive gears and said first and second small drive gears, pneumatic clutches between each of said clutch webs and the coplanar drive gear thereon, said clutches when energized being engageable with said drive gears, parallel pneumatic connections to said clutches engageable with said large drive gears, and parallel pneumatic connections to said clutches engageable with said small drive gears.

3. A dredge drive for use between an upper tumbler shaft and a relatively long drive shaft subject to substantial twist when under load including a pair of drive units connected to said upper tumbler shaft and connected to said drive shaft near the ends thereof, each drive unit having a bull gear, a bull pinion meshing with said bull gear, a pair of clutch webs fixed to rotate with said bull pinion, a pair of pneumatic clutches on said clutch webs, a large drive gear mounted to rotate with respect to said bull pinion and incorporating a first clutch drum for one of said clutches, a small drive gear mounted to rotate with respect to said bull pinion and incorporating a second clutch drum for the other of said clutches, a small drive pinion fast on said drive shaft and meshing with said large drive gear, a large drive pinion fast on said drive shaft and meshing with said small drive gear, pneumatic connections to said pneumatic clutches, and means for selectively energizing said connections.

4. A dredge drive comprising a pinion shaft, a pinion fast on said shaft, a clutch hub fast on said pinion shaft, said hub including a pair of radial webs each having an aperture therein and said hub including a pair of journal bearings, a pair of drive gears each including a radial plate having an opening therein and each including a journal sleeve running on one of said journal bearings and each including a clutch drum overlying a respective one of said clutch webs, pneumatic clutches one on each of said clutch webs and engageable with a respective one of said clutch drums, and pneumatic connections to each of said clutches passing through said apertures and accessible through said openings and extending through said clutch hub and said pinion shaft.

References Cited in the file of this patent

UNITED STATES PATENTS

| 2,304,032 | Schmitter | Dec. 1, 1942 |
| 2,536,549 | Hindmarch | Jan. 2, 1951 |
| 2,632,544 | Hockert | Mar. 24, 1953 |